United States Patent
Hoang

(10) Patent No.: US 11,733,772 B2
(45) Date of Patent: Aug. 22, 2023

(54) VIEWING A VIRTUAL WORLD THROUGH A VIRTUAL WINDOW

(71) Applicant: SUREFIRE, LLC, Fountain Valley, CA (US)

(72) Inventor: Vuong Ba Hoang, Mission Viejo, CA (US)

(73) Assignee: SUREFIRE, LLC, Fountain Valley, CA (US)

( * ) Notice: Subject to any disclaimer, the term of this patent is extended or adjusted under 35 U.S.C. 154(b) by 0 days.

(21) Appl. No.: 17/501,801

(22) Filed: Oct. 14, 2021

(65) Prior Publication Data

US 2023/0122434 A1    Apr. 20, 2023

(51) Int. Cl.

| | | |
|---|---|---|
| *G06F 3/00* | (2006.01) | |
| *G06F 3/01* | (2006.01) | |
| *G06T 15/20* | (2011.01) | |
| *G06F 3/14* | (2006.01) | |
| *H04N 9/31* | (2006.01) | |
| *G09B 5/02* | (2006.01) | |
| *F41J 11/00* | (2009.01) | |

(52) U.S. Cl.
CPC ............ *G06F 3/012* (2013.01); *G06F 3/1454* (2013.01); *G06T 15/20* (2013.01); *H04N 9/31* (2013.01); *F41J 11/00* (2013.01); *G09B 5/02* (2013.01)

(58) Field of Classification Search
None
See application file for complete search history.

(56) References Cited

U.S. PATENT DOCUMENTS

| | | | |
|---|---|---|---|
| 2004/0070674 A1* | 4/2004 | Foote | H04N 7/18 348/207.99 |
| 2013/0201276 A1* | 8/2013 | Pradeep | H04N 7/157 348/E7.078 |
| 2015/0000025 A1* | 1/2015 | Clements | G06F 3/041 4/443 |
| 2017/0018121 A1* | 1/2017 | Lawson | G06T 19/006 |

(Continued)

OTHER PUBLICATIONS

Invitation to Pay Additional Fees dated Jan. 23, 2023 for International Application No. PCT/US2022/045227, filed Sep. 29, 2022.

(Continued)

*Primary Examiner* — Patrick F Valdez
(74) *Attorney, Agent, or Firm* — Sheppard, Mullin, Richter & Hampton LLP

(57) ABSTRACT

Systems and methods for providing a virtual window may include a projector, which projects an image upon a projection surface. The projection surface can be arranged at a distance of separation from a user. The system can further comprise a plurality of sensors forming a field of detection with respect to an area of space encompassing the distance of separation between the projection surface and the user. The plurality of sensors can capture position data for the user representing a current position of the user within the field of detection. The system can also include at least one processor rendering a computer simulated environment as the projected image, wherein the at least one processor processes the captured position data such for the user such that the computer simulated environment is generated in a perspective relative to the current position of the user within the field of detection.

19 Claims, 5 Drawing Sheets

(56) References Cited

U.S. PATENT DOCUMENTS

2017/0108922 A1* 4/2017 Terahata .............. H04N 23/611
2018/0103237 A1* 4/2018 Chaney ................ H04N 7/147
2019/0325556 A1* 10/2019 Leong .................. G06V 40/23
2020/0051336 A1* 2/2020 Ichikawa ............. G06T 19/006

OTHER PUBLICATIONS

International Search Report and Written Opinion dated Mar. 29, 2023 for International Application No. PCT/US2022/045227.

* cited by examiner

VIEWING A VIRTUAL WORLD THROUGH A VIRTUAL WINDOW

TECHNICAL FIELD

Embodiments of the present disclosure relate generally to methods and systems for visual projector technology, for example, in generating virtual reality (VR) environments that can be immersive and interactive for users.

BACKGROUND

Virtual reality (VR) is the use of computer modeling and simulation that enables a person to interact with an artificial three-dimensional (3-D) visual or other sensory environment. Currently, many VR applications immerse the user in a computer-generated environment that simulates reality through the use of interactive devices, which send and receive information. Typically, these interactive devices are often directly arranged on and/or mounted to the users' body, for example being worn as goggles around the user's eyes, headsets covering the user's head (and eyes), gloves, or body suits. In a typical VR format, a user wears a VR headset with a stereoscopic screen which allows them to view animated images of a simulated environment.

BRIEF SUMMARY OF THE DISCLOSURE

In accordance with an embodiment of the disclosed technology, a system and method for projection of a simulated environment, such as virtual reality (VR), onto a surface that is distanced form the user in a manner that can eliminate the required use of wearable interactive devices, is described.

In accordance with an embodiment of the disclosed technology, a system can comprise a projector, which projects an image upon a projection surface. The projection surface can be arranged at a distance of separation from a user. The system can further comprise a plurality of sensors forming a field of detection with respect to an area of space encompassing the distance of separation between the projection surface and the user. The plurality of sensors can capture position data for the user representing a current position of the user within the field of detection. The system can also include at least one processor rendering a computer simulated environment as the projected image, wherein the at least one processor processes the captured position data such for the user such that the computer simulated environment is generated in a perspective relative to the current position of the user within the field of detection.

In accordance with another embodiment of the disclosed technology, a method can comprise enabling two or more projector devices. Each of the two or more projector devices can be placed in separate physical environments and each separate physical environment can include a respective user that is in view of their respective projector device. Further, a shared computer simulated environment can be created using the two or more projector devices, wherein the shared computer simulated environment comprises a three-dimension (3-D) image rendering that includes a visual representation of each of the users at the separate physical environments. Then, the shared computer simulated environment can be projected onto two or more projection surfaces, wherein each of the two or more projection surfaces are respectively placed in the separate physical environments in view of the respective user.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
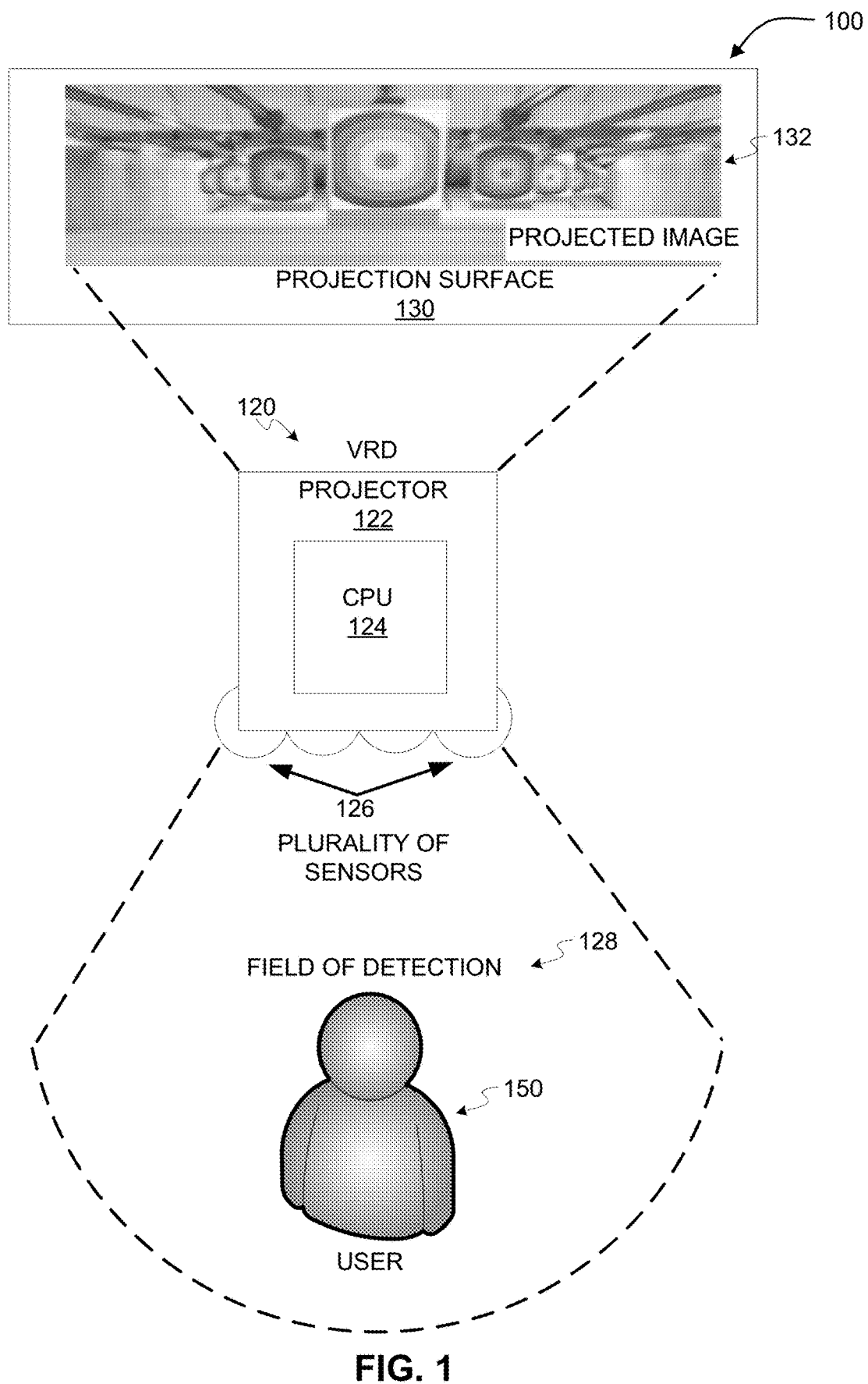
FIG. 1 depicts an example environment in which a virtual reality (VR) projector can be implemented to immerse a single user in a VR environment, for example, in accordance with an embodiment of the technology disclosed herein.

The figures are not exhaustive and do not limit the present disclosure to the precise form disclosed.

DETAILED DESCRIPTION

As referred to herein, the term virtual reality (VR) technology can encompass the plurality of forms of immersive technologies, such as VR, augmented reality (AR), mixed reality, extended reality (XR), three-dimensional visualization, and the like, that are capable of generating a realistic and immersive computer simulation of a three-dimensional (3-D) environment which enables a user to interaction.

As background, VR environments are particularly designed to create a phenomenon known as presence. Presence refers to the physical and mental sensations of a human that simulates the user physically "being there" while immersed in the simulated (or VR) environment. Presence can be effected by motion sensors that detect the user's movements and adjust the view on the screen accordingly, nominally in real-time (e.g., as the user's movement takes place). Presence can be further supported in VR environments as the objects that are simulated within the environment have a sense of "spatial presence." Spatial presence can be described as the objects in the environment effectively have a location in three-dimensional space that is relative to and independent of the position of the user. One objective of "presence" and "spatial presence" may be to generate a simulation that presents the correct cues to human perceptual and cognitive system so that the brain interprets those cues as objects in the three-dimensional world from a point of view which matches the visual perspective of the user (e.g., positions of the user's eyes) as they move about within the virtual world.

In some embodiments, the VR environments generated by the disclosed method and system are computer-generated 3-D environments that include both computer graphics and 360-degree video, which surrounds a user and responds to user interactions. Gesture recognition or handheld controllers provide hand and body tracking, and haptic (or touch-sensitive) feedback may be incorporated. Room-based systems provide a 3-D experience while moving around large areas, or they can be used with multiple participants. Thus, a VR environment can simulate many real-world experiences, such as moving though a simulated suite of different scenes, experiencing changing viewpoints and perspectives that are convincingly related to the user's own head turnings and steps. Another common VR feature involves wearing data gloves equipped with force-feedback devices that provide the sensation of touch, the user can even pick up and manipulate objects that he or she sees in the virtual environment. Due to the technology's many powerful interactive capabilities, and realistic immersive experiences, VR is emerging as a tool that is used in a wide range of applications, such as entertainment (e.g., video games), education (e.g., medical training, military training, armed training), and business (e.g., virtual meetings). However, such experiences involving VR typically require a user to either hold a device in his or her hands, or wear an apparatus on his or her head (e.g., goggles). Being restricted to such interactive devices can be uncomfortable or cumbersome for a large number of users.

Furthermore, as VR designers strive to improve "presence" of the simulated environment, a phenomena called "VR motion sickness" may be experienced by the user. As an example, while a person is using a VR headset, their eyes will register the movements being simulated around them, and their inner ears will also sense that virtual movement is happening around them. But despite the images being generated in the VR headset, the person's muscles and eyes will continue to sense that they're sitting still, and not in motion. As a result, users of many interactive devices, such as VR goggles and headsets, while experience their inner ears (e.g., sensing movement) and body (e.g., sensing being stationary) sending mixed messages to the brain simultaneously. Consequently, it is not uncommon for users immersed in a VR experience to feel "VR motion sickness" that mimics motion sickness generated by actual movement.

The system disclosed herein implements a device, which is hereinafter referred to as a View Rendering Device (VRD), that integrates VR (or 3-D) projection and real-time VR (or 3-D) computer rendering capabilities. Accordingly, the VRD can be employed to provide a completely immersive VR experience that does not require various interactive devices, such as portable computing device (e.g., a tablet, smartphone), VR goggles, VR headsets, or other wearable interactive devices and further does not restrict the user's movement. The description refers to "VR environments" for purposes of illustration, but it should be understood that it is not intended to be limiting, and the disclosed embodiments can be implemented for presenting other forms of 3-D environments and/or immersive environments that are known in the technology. According to embodiments, the VRD is distinctly designed to project a 3-D image onto a projection surface that is separated at a distance from away from the user. Additionally, the VRD supports real-time VR rendering functions, such as detecting the position and/or movement of the user and determining spatial presence within the simulation, which are integral to creating a simulated VR environment for users. Therefore, the disclosed embodiments realize the advantages of creating an immersive VR environment for users by leveraging projection in manner that does not require common types of interactive devices, and ultimately alleviates the undesirable effects on the user cause by employing such devices, such as disorientation, confusion, and VR motion sickness.

FIG. 1 illustrates an example environment for implementing a system 100 for projecting three-dimensional (3-D) simulation images that ultimately create a full VR environment that can be viewed and interacted with by a single user, or by multiple users located proximately to each other (e.g., in the same vicinity or physical area). In the example of FIG. 1, the system 100 includes a View Rendering Device (VRD) 120, which can include, at least: a projector 122 configured for projecting 3-D images onto a projection surface 130, in accordance with 3-D projection technologies; a central processing unit (CPU) 124 configured for processing data and algorithms, and rendering the 3-D images used in creating a 3-D computer simulated environment, in accordance with VR technology; and a plurality of sensors 126 configured to capture position data of the user 150. In various embodiments, the VRD 120 is particularly configured to integrate VR (or 3-D) projection functions and real-time VR (or 3-D) computer rendering capabilities. In the example of FIG. 1, the VRD 120 is shown to project a projected image 132 (e.g., 3-D image) onto a projection surface 130 which creates a VR environment that is capable of fully immersing the user 150 into a computer-generated simulation. The projection surface 130 can be a wall, floor, ceiling, panel, or any suitable stably fixed surface (or combination of multiple surfaces) that has the appropriate dimensions for displaying the desired 3-D images. The projected image 132 can be computer rendered multi-dimension images or graphics, such as 3-D images, that are visible to the user 150, and thus provide the imagery creating a simulated environment in VR, for example. The projected image 132 can be rendered and projected by the VRD 120 such that the images have depth, varying space, and other visual stimuli from the perspective of the user 150 that immerses them into a simulated environment in accordance with VR (or other immersive simulation technologies). FIG. 1 illustrates that by projecting the projected image 132 onto the projection surface 130 at a distance away from the user 150, the system 100 creates a perception for the user 150 of viewing a "virtual world" through a "virtual window" to experience the VR environment, as opposed to viewing the simulation through interactive devices worn by the user (in extremely close proximity to the eyes), such as VR goggles or a VR headset. In other words, the user 150 can view the 3-D images being projected onto a wall, for example, by the VRD 120 to look into a fully immersive and 3-D "virtual world" in a manner that is similar to a looking out of the window to see physical scenes in the "real world."

Generally, the system 100 can be arranged in various physical environments having a space large enough for the components of the system 100 to be situated at appropriate distances away from a user 150 to properly support room scale VR. As an example, an environment suitable for room scale VR and conducive to implementing the disclosed system 100 may have the approximate dimensions of at least 2 meters L×2 meters W (6.5 ft×6.5 ft) of free space. Physical environments such as large indoor rooms and outdoor areas may be ideal locations to set up the system 100, and project the 3-D images in accordance with room scale VR. Further, the physical environment should provide the spacing necessary for the user 150 to have the freedom of movement (e.g., 360° rotation) that enables immersion into a VR environment and user interaction with the simulation in room scale VR. As alluded to above, an important aspect of the system 100 involves the user 150 observing the VR environment as it is projected at a substantive distance (e.g., feet) away from their eyes, rather than having the VR environment projected at an extremely close proximity (e.g., millimeters) to their eyes, as is common with VR headsets, VR goggles, and the like. Thus, as seen in FIG. 1, the projection surface 130 is arranged at a distance of separation from a user.

Also, the plurality of sensors 126 of the VRD 120 can be situated at various locations on the device such the sensors 126 form a field of detection 128 (indicated in FIG. 1 by dashed lines surrounding user 150) with respect to the area of space that encompasses the distance of separation between the projection surface 130 and the user 150. Accordingly, as the user 150 moves within the field of detection 128 during the simulation, the plurality of sensors 126 are capable of detecting the user 150 and capturing their corresponding position data, which represents a current position of the user 150 within the field of detection 128.

As shown in FIG. 1, the VRD 120 can comprise a CPU 124. The CPU 124 can include various hardware components, such as processor(s) and memory, and software elements such as algorithms, modules, and applications for providing real-time 3-D image rendering capabilities and various other real-time VR capabilities, such as depth sensory, spatial presence, and user movement tracking (e.g., detecting location and/or directional movement of the user) in conjunction with the other components of the system 100. For example, position data of the user 150 that is captured by the plurality of sensors 126 can then be processed and/or analyzed by the CPU 124 such that the computer simulated environment (e.g., VR environment) can be dynamically rendered in a perspective relative to the current position of the user 150 within the field of detection 128 in real-time. The CPU 124 may be considered a high-performance computer, having the processing capabilities necessary to execute calculations and/or algorithms to implement 3-D image rendering and other features related to VR and/or simulation immersion technology, as well as algorithms to implement complex data analysis functions, such as predictive math based on the current and immediate historical movement of the user 150. As an example, the CPU 124 can be configured to calculate predictive data associated with the user 150 based on currently captured position data representing the current position of the user within the field of detection 128, and historical captured position data representing past positions of the user within the field of detection 128. As a result, the CPU 124 can then generate the 3-D image rendering using predictive data that represents current and/or predicted future movement of the user, and historical data that represents the past movement of the user. By having the capability to predict a user's position and/or movement, the CPU 124 can re-render the 3-D simulated images with improved efficiency and reduced latency (e.g., reduce network latency).

In some embodiments, the CPU 124 can have other hardware and/or software modules (not described herein) that reside thereon to perform functions associated with providing simulated environment in real-time using VR technology and 3-D projection techniques. Although the CPU 124 is shown as being physically integrated into the singular device including the projector 124, plurality of sensors 126, and other components of the VRD 120, this configuration is not intended to be limiting. In some embodiments, the CPU 124 may be a physical stand-alone component, being physically separated from the other elements of the VRD 120 while continuing to communicate (e.g., communicatively coupled by a communication network or physical connector) and function in concert with the projector 122 and plurality of sensors 126 to perform the features and capabilities described herein.

In addition, FIG. 1 depicts that the VRD 120 can include a plurality of sensors 126. In an embodiment, the sensors 126 can be implemented as rear-facing cameras. That is, the plurality of sensors 126 can be cameras that are oriented in a direction facing towards the user 150 standing behind the VRD 120. Each individual sensor in the plurality of sensors 126 can be arranged to have an independent location and field of view. Collectively, the aggregation of the independent fields of view for each of the plurality of sensors 126 can form a larger field of detection with respect to a volume of space that encompasses the distance of separation between the projection surface 130 and the user 150. In some embodiments, the plurality of sensors 126 are registered into a single 3-D coordinate system which allows the sensors to detect position, movement and depth values corresponding to the user 150 in the real world (within the field of detection 128) which ultimate allows the rendering of the VR environment to be calibrated for spatial presence in a perspective of the user 150. For example, the plurality of sensors 126 can detect the user's 150 body position and orientation, especially their head position and orientation and relay this information to other the components of the VRD 120, such as the CPU 124, for further processing and/or analyzing.

In some embodiments, the plurality of sensors 126 can be employed to capture movement of the user 150 with respect to interaction and control of virtual objects within the VR environment. For example, the sensors 126 may be utilized in a manner that allows users to sense and control various virtual objects in real-time. This further enables the VR environment to include interactive responses (e.g., scene change) and/or feedback to the user's input as detected by the sensors 126. The plurality of sensors 126 can be used by the system 100 to support gesture interaction technology, input devices for gesture interaction, and gesture interaction recognition technology.

In some embodiments, the plurality of sensors 126 may be included to detect not only the position and/or movement of a user, but also to detect other objects and users that may also be within the field of detection 126 during the simulation, as well. This can enable various additional features for the system 100, such as allowing other users to be depicted into the simulation, and supporting augmented reality (AR) to model surrounding real-would objects into the simulation and to project aspects of the simulation onto surrounding objects. The plurality of sensors 126 can be implemented as various types of sensors having the capability to detect location and/or movement in a surrounding environment, for example: sonar, ultrasonic distance sensors, radar, Light Detection and Ranging (LIDAR), and cameras or other image sensors. In some embodiments, cameras can be high dynamic range (HDR) cameras or infrared (IR) cameras. Accordingly, the plurality of sensors 126 can be configured to acquire, and/or sense position data and/or movement data for the user 150. For example, the plurality of sensors 126 can be configured to detect, quantify and/or sense objects in at least a portion of the field of detection 128 and/or information/data about such users and/or objects. As mentioned above, the plurality of sensors 126 can detect users and objects that can be stationary objects and/or dynamic objects. Further, the plurality of sensors 126 can be configured to detect, measure, quantify and/or sense other spatial or environment characteristics that may be within the field of detection 128.

Also, FIG. 1 shows that the VRD 120 can include a projector 122. The projector 122 can be described as a hardware device having optical emission capabilities to impose multi-dimensional (3-D) images onto a surface dedicated to displaying the projected images, such as projection surface 130, in a manner that supports room scale VR. In some embodiments, the projector 122 is implemented as a stereoscopic projector, which supports high resolution, high image quality, and high 3-D stereo flexibility that is suitable for VR technology. The projector 122 can be implemented using other types of known projection technologies, such as laser projection. In operation, the projector 122 receives the rendered 3-D image content from the CPU 124. Then, the VRD 120 can project these rendered 3-D images and/or graphics onto the projection surface 120 in a multi-dimension effect to create a VR environment including an immersive and interactive experience for the user 150. The projector 122 can include at least one projection port and optics for optically projecting the 3-D image. According to embodiments, the projector 122 is particularly configured to enable 3-D projection and VR projection capabilities such that multi-dimensional images can be imposed onto the projection surface 130. As previously described, it is a key aspect of the system 100 to leverage 3-D projection and VR projection capabilities of the VRD 120 to allow an VR environment (or simulation) to be experienced by the user 150 within a volume of space (e.g., room). In some embodiments, the projector 122 is capable of projecting in accordance to other types of simulation and immersion technologies, for example providing mixed reality and/or AR effects in the simulation.

For purposes of illustration, the example environment shown in FIG. 1 can be an indoor room, wherein the system 100 can be implemented to project 3-D images to ultimately provide room scale VR. FIG. 1 illustrates an example of an VR environment that can be used for arms training, where the projected image 132 is a gun range (including multiple targets). In some cases, the virtual environment can be scenery conceived by a designer or a reproduction of the live scene. The VRD 120 is generally located between the user 150 and the projection surface 130 (which may be a wall in this example). As previously described, the projection surface 130 is arranged at a distance of separation from the user 150. The VRD 120 can be set-up at any location within this distance of separation between the user 150 and the VRD 120, generally speaking. In an example operation, as the user 150 moves within the field of detection 120, their body position and orientation, particularly the position and orientation the user's 150 head can be captured by the plurality of sensors 126 and relayed to the CPU 124 for processing.

The VRD 120 can use this position data obtained by the plurality of sensors 126 and renders a 3-D image, shown as the projected image 132, onto the projection surface 130 that takes into account the user's 150 position in relation to how VR environment is presented. In this way, as the user 150 moves through the field of detection 128, the VRD 120 can dynamically re-render the projected image 132 in a manner that mimics a simulated 3-D representation with perceived depth, for instance allowing the user will be able to move around in the field of detection 128 to see behind or around objects in the VR simulation that are being projected on the projection surface 130.

As an example, if the user's 150 head turns to the left, the graphics of the example VR environment can detect this motion and react accordingly, for instance adjusting the rendering of the projected image 132 to movie the center target more to the right of the screen. Accordingly, the 3-D projection and 3-D rendering capabilities of the disclosed system 100 may allow a rendering of multi-dimensional (e.g., 3-D) images and graphics to be projected in a controlled fashion in the room in a manner that provides an immersive VR environment within the open area of the room.

According to various disclosed embodiments, the system 100, including the VRD 120, can provide an immersive experience to users by generating various types of interactive activities related to visual, auditory, and tactile perceptions. Professional equipment such as VR headsets and data gloves allow users to sense and control various virtual objects in real time, creating an experience that users cannot obtain in the real world and generating real response or feedback.

Figure 2:
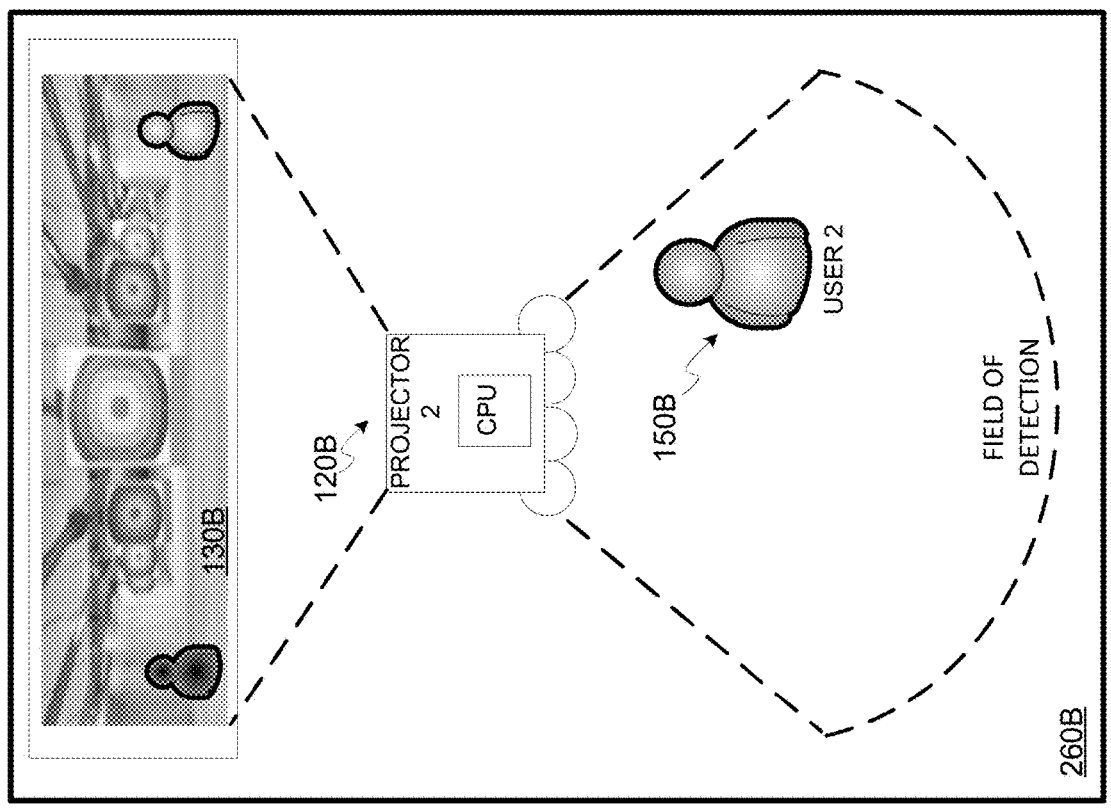
FIG. 2 depicts an example environment in which two VR projectors can be implemented to immerse multiple remotely located users in a VR environment, for example, in accordance with an embodiment of the technology disclosed herein.
Figure 2:
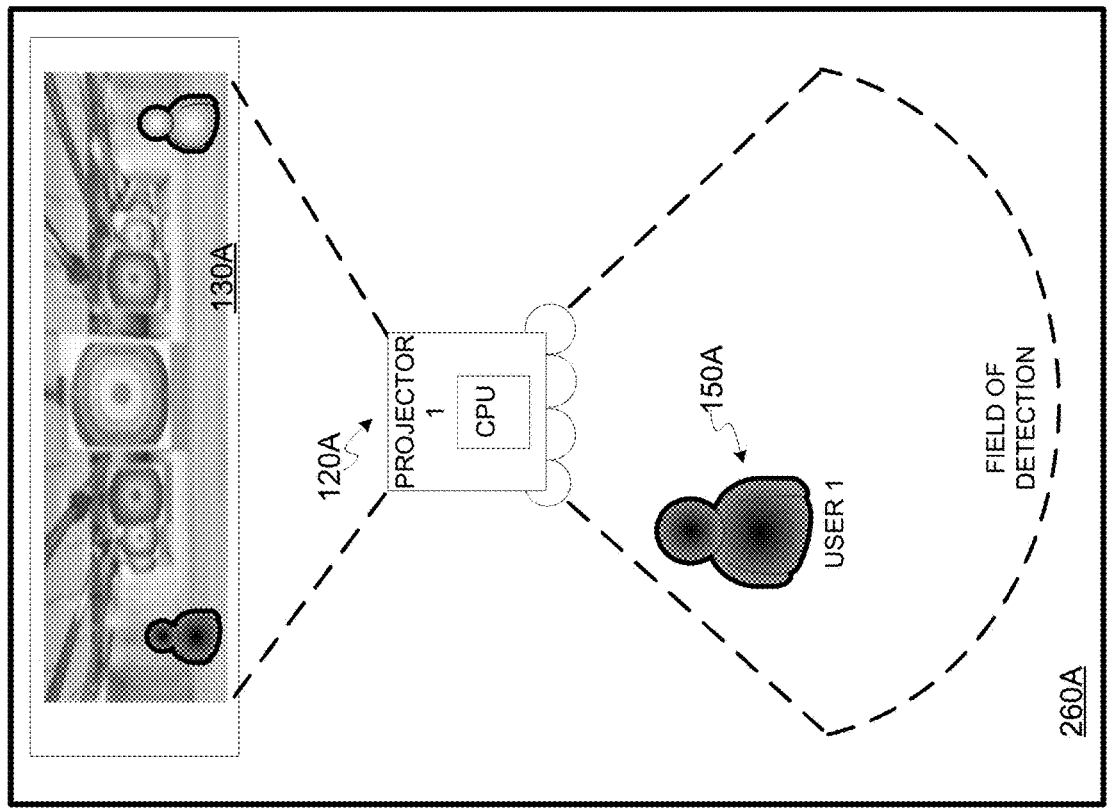

FIG. 2 depicts an example environment 200 in which two VRDs, shown as a first VRD 120a and second VRD 120b, can be implemented to immerse multiple remotely located users into a shared VR environment simultaneously. In other words, the example environment 200 is configured such that a shared VR environment can be presented to multiple users at different locations via multiple "virtual window" arranged at each of the respective locations. FIG. 2 principally include the same structure and function as previously described above in reference to FIG. 1. Thus, for purposes of brevity, the details of the system and the respective VRDs 120a, 120b are not described again regarding FIG. 2.

The configuration in FIG. 2 does differ from FIG. 1, as the environment 200 includes a first VRD 120a and a second VRD 120b that can be are utilized to present a shared VR environment for multiple users, where the VRDs 120a, 120b and the users 150a, 150b can be located in separate physical environments. This configuration in FIG. 2 may be advantageous is various real-world applications, where a simulation that can be experienced simultaneously by a group of users (that may be geographically distributed) is useful. For example, the configuration depicted in FIG. 2 can be used to achieve a simulated force-on-force combat training, where the other users that are participating in the combat simulation can be included in the 3-D graphics that are projected by the remote VRDs.

Referring back to FIG. 2, the first VRD 120a can be set-up in a first physical location 260a, such as a room in a building where the first user 150a is physically present, and the second VRD 120b can be set-up in a second physical location 260b, such as a another room on a different floor of a building where the second user 150b is physically present. In this arrangement, the multiple users 150a and 150b can be remotely located with respect to each other, while the 3-D images and/or graphics that are presented on their respective projection surfaces 120a, 120b creates a shared simulation.

In an embodiment, each of the VRDs 120a, 120b can be programmed to enable a shared simulation. For example, a "shared simulation" feature implemented by the first VRD 120a can be enabled which allows the first VRD 120a to be aware of the other remotely located VRDs that have also been enabled to be involved in the shared simulation, for instance the second VRD 120b. Subsequently, the enabled VRDs 120a, 120b can be communicatively coupled, allowing these devices to transmit and/or receive data. In particular, position data corresponding to the users 150a, 150b that may be separately captured by the VRDs 120a, 120b positioned at their respective locations may be communicated to the remote VRDs. For example, the first VRD 120a can capture position data for the user 150a at that particular physical location, and then transmit the captured position data to the remotely located VRD, which is second VRD 120b in the example. As a result, both VRDs 120a, 120b can obtain and analyze the position data for each user 150a, 150a, and further these devices have the information necessary to create a shared VR environment that can be experienced by user 120a and 120b simultaneously. FIG. 2 serves to illustrate that the shared VR environment that is presented to each of the users 150a, 150b includes substantially the same rendering of the 3-D images. As seen, the 3-D rending projected on projected surface 130a that is within view of user 120a depicts the same virtual shooting range that is projected onto projected surface 130b that is within view of user 120b. However, the VRDs 120a, 120b have adjusted respective 3-D rendering to include a visual representation of the other user that is participating in the shared simulation at the separate physical environments. To illustrate this capability, the 3-D image projected onto the projection surface 130a at the first location has been specifically rendered to simulate the presence of user 120b. As seen, user 120b is spatially modeled in the shared simulation with respect to their physical position in the field while interacting with the VR environment. For instance, user 120b is standing to the right of the detection field at the second location 260b. In response, the VRD 120a can render the 3-D images that are imposed onto projection surface 130a to show the representation of user 150b generally on the right of the VR environment. Alternatively, the VRD 120b can render the 3-D images that are imposed onto the projection surface 130b to show the representation of user 120a being generally on the left of the VR environment (user 120a standing to the right of the detection field at the first location 260a). It should be appreciated that FIG. 2 is one example configuration for the disclosed system, and other configurations not shown in the figures can be utilized to support the shared simulation functions in a manner that is expanded and/or scaled to include varying numbers of VRDs and users as discloses herein.

Figure 3:
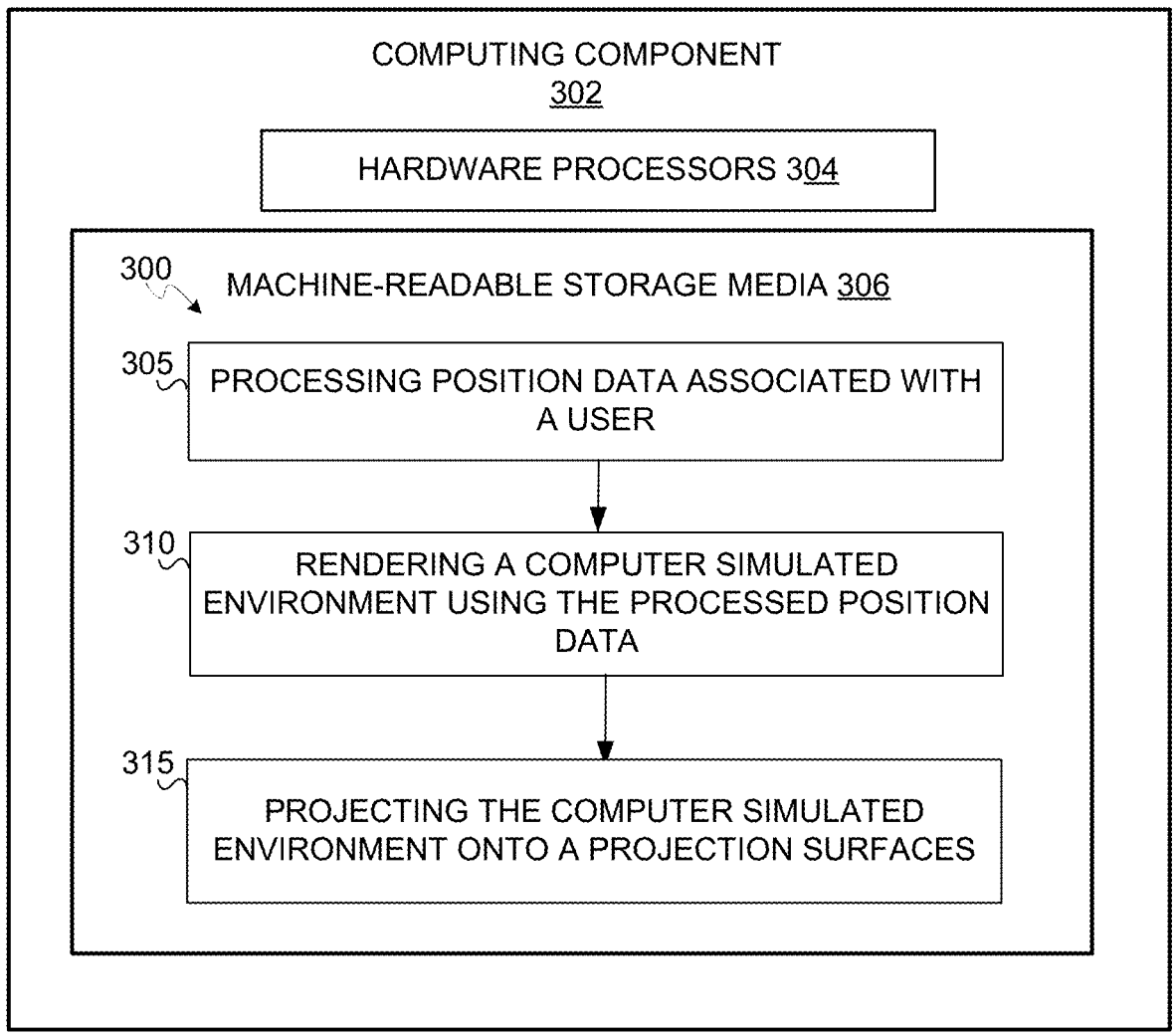
FIG. 3 is an operational flow diagram illustrating an example of a process for implementing projection of a VR environment, according to some embodiments.

Further details of the disclosed projected VR environment features are now described with reference to FIG. 3, which illustrates an example of a process 300 according to one embodiment of the systems and methods described herein. As seen in FIG. 3, process 300 is illustrated as a series of executable operations in a machine-readable storage media 306 performed by a hardware processor 304. The computing component 302 can be a VRD (shown in FIG. 1) implementing the VR projection and VR rendering capabilities, as previously described.

At operation 305, processing of position data associated with a user can be performed. In some embodiments, the processing can be performed by one or more processors, for instance a CPU of the VRD (shown in FIG. 1). The position data can represent a current position of the user within a field of detection. The field of detection can be formed by a plurality of sensors with respect to an area of space encompassing the distance of separation between the projection surface and the user. The position data processed in operation 305 may be captured by the plurality of sensors implemented as camera, for example.

Next, at operation 310, a computer simulated environment using the processed position data can be rendered. In some embodiments, the rendering can be performed by one or more processors, for instance a CPU of the VRD (shown in FIG. 1). The computer simulated environment can be comprised of multi-dimensional (3-D) images and/or graphics, and the simulated implemented as a VR environment that is immersive and interactive for the user. Further, rendering performed in operation 310 can involve generating the computer simulated environment in a manner that has depth perception with respect to a current position of the user. In this way, as the user moves through the field of detection, the computer simulated environment can be rendered to mimic a simulated 3-D representation with perceived depth. Further, the computer simulated environment can be rendered in operation 310 such that perspective of the environment is relative to the current position of the user within the field of detection. That is, as the user moves within the field of detection, the computer simulated environment can be re-rendered to react in accordance to the user's movement.

After the computer simulated environment is rendered in previous operation 310, the process 300 can proceed to operation 315 where the rendering can be projected into a projection surface. According to embodiments, the projection surface can be arranged at a distance of separation from the user in a manner that supports room scale VR, where the user is immersed in a VR environment within the volume of space of a room, for example.

Figure 4:
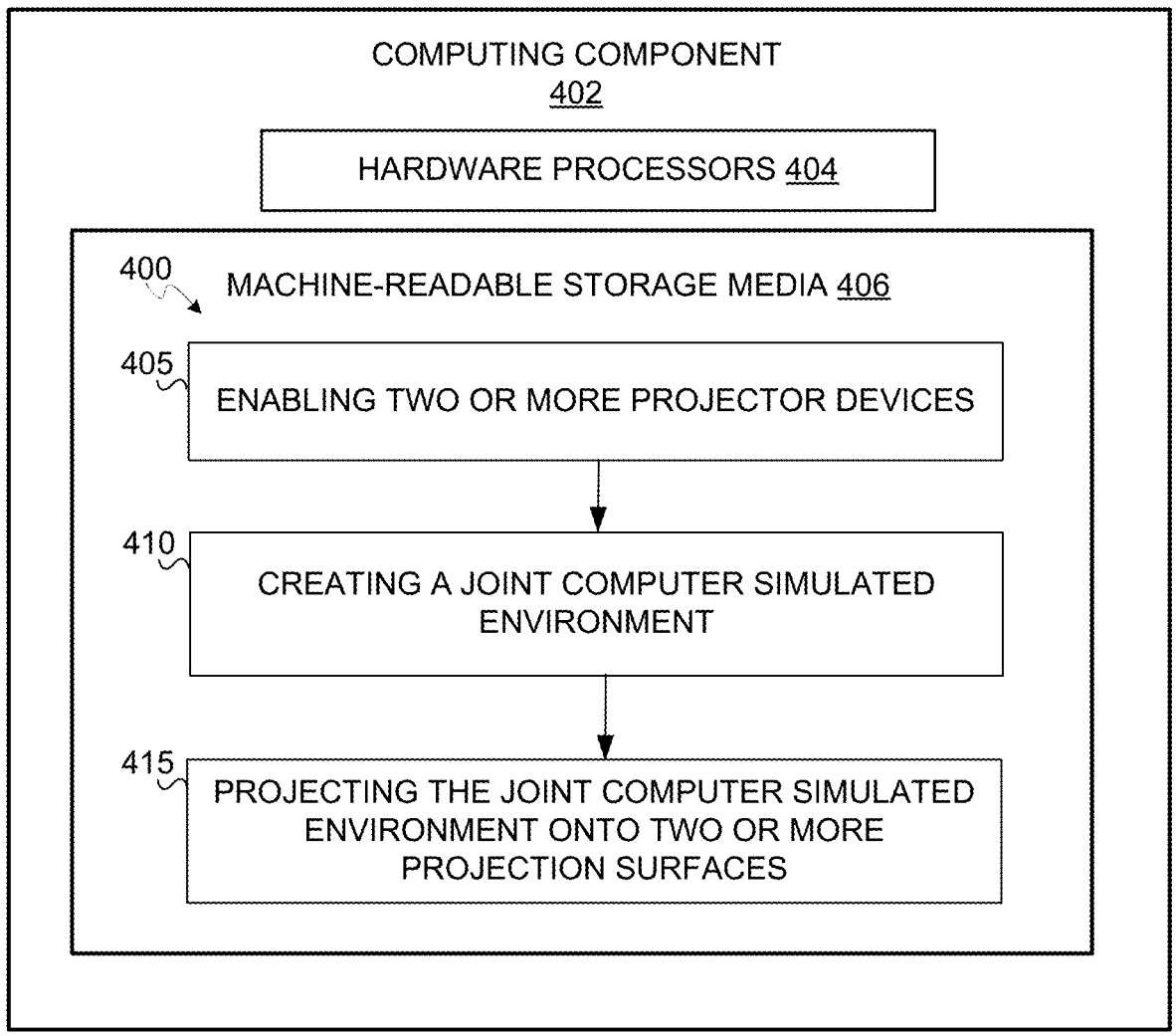
FIG. 4 is an operational flow diagram illustrating an example of a process for implementing projection of a shared simulation, such as VR environment that can be presented simultaneously to multiple remotely located users, according to some embodiments.

Further details of the shared simulation features are now described with reference to FIG. 4, which illustrates an example of a process 400 according to one embodiment of the systems and methods described herein. As seen in FIG. 4, process 400 is illustrated as a series of executable operations in a machine-readable storage media 406 performed by a hardware processor 404. The computing component 402 can be a VRD (shown in FIG. 1) implementing the VR projection and VR rendering capabilities, as previously described. Generally, process 400 implements projection of a shared simulation, such as VR environment that can be presented simultaneously to multiple remotely located users, according to some embodiments.

The process 400 can begin at operation 405. Operation 405 can include enabling two or more projector devices. According to embodiments, the projector devices can be implemented as VRDs (shown in FIG. 2). By enabling the projector devices for shared simulation, each of the devices can be communicatively coupled to the other enables devices in a manner that allows information, such as position data, to be communicated across projector devices. Accordingly, operation 405 can involve receiving position data for each of the users at the separate physical environments representing a current position of each of the users. The position data for each of the users at the separate physical environments may be captured by the respective projector device, for instance using the plurality of sensors implemented on the VRD (shown in FIG. 1). Each of the two or more projector devices can be placed in separate physical environments, and each separate physical environment can include a user in view of their respective projector device.

Subsequently, step 410 can include creating a joint computer simulated environment using the two or more projector devices. The joint computer simulated environment can be generated to comprise a 3-D image rendering that includes a visual representation of each of the users at the separate physical environments.

Thereafter, the process 400 can continue to operation 415. At operation 415, the shared computer simulated environment can be projected onto two or more projection surfaces, wherein each of the two or more projection surfaces are respectively placed in the separate physical environments in view of their respective users. Thus, the other users that are participating in the shared simulated at remote locations can be modeled in the particular 3-D rendering that is presented to user.

Figure 5:
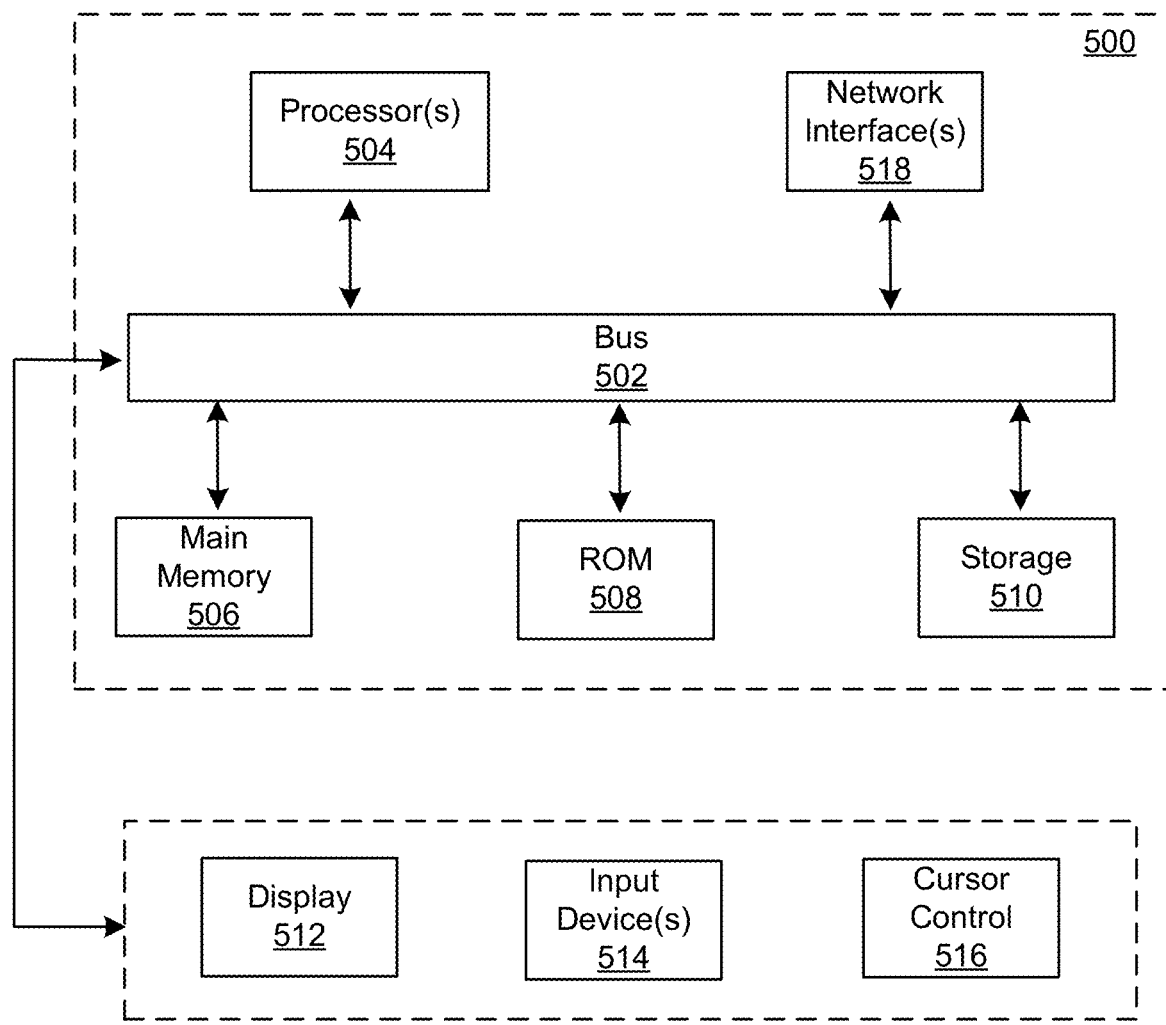
FIG. 5 illustrates an example computing system that may be used to implement various features of embodiments described in the present disclosure.

FIG. 5 depicts a block diagram of an example computer system 500 in which the VR projection and VR rendering capabilities described herein may be implemented. For example, the computer system 500 may be used to implement the CPU of the VRD, as illustrated in FIG. 1. The computer system 500 includes a bus 502 or other communication mechanism for communicating information, and one or more hardware processors 504 coupled with bus 502 for processing information. Hardware processor(s) 504 may be, for example, one or more general purpose microprocessors.

The computer system 500 also includes a main memory 508, such as a random-access memory (RAM), cache and/or other dynamic storage devices, coupled to bus 502 for storing information and instructions to be executed by processor 504. Main memory 508 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor 504 may be programmed by one or more additional instructions that may perform some or all of the functionality attributed herein to one of the instructions.

The computer system 500 further includes storage device 510. The various instructions described herein, including the advanced analytics demand forecasting techniques, may be stored in a storage device 510, which may comprise read only memory (ROM), and/or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The storage device 510 may store the computer program instructions (e.g., the aforementioned instructions) to be executed by processor 504 as well as data that may be manipulated by processor 504. The storage device may comprise one or more non-transitory machine-readable storage media such as floppy disks, hard disks, optical disks, tapes, or other physical storage media for storing computer-executable instructions and/or data.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 508. Such instructions may be read into main memory 408 from another storage medium, such as storage device 510. Execution of the sequences of instructions contained in main memory 508 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 508. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated service digital network (ISDN) card, cable modem, satellite modem, or a modem to provide a data communication connection to a corresponding type of telephone line. As another example, network interface 518 may be a local area network (LAN) card to provide a data communication connection to a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. Wireless links may also be implemented. In any such implementation, network interface 518 sends and receives electrical, electromagnetic, or optical signals that carry digital data streams representing various types of information. The nodes of the decentralized model building system, as disclosed herein, may be coupled to other participant nodes via the abovementioned networks.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet." Local network and Internet both use electrical, electromagnetic, or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network, and the communication interface 518.

The received code may be executed by processor 504 as it is received, and/or stored in storage device 510, or other non-volatile storage for later execution.

The various processes, methods, operations and/or data flows depicted in FIG. 3 and FIG. 4 (and in the other drawing figures) described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
a first projector configured to project an image onto a first projection surface arranged at a first distance of separation from a first user;
a first plurality of sensors configured to:
form a first field of detection with respect to a first area of space encompassing the first distance of separation between the first projection surface and the first user; and
capture first position data for the first user representing a current position of the first user within the first field of detection; and
at least one processor configured to:
receive second position data captured by a second plurality of sensors for a second user remotely located from the first user, the second position data representing a current position of the second user within a second field of detection formed with respect to a second area of space encompassing a second distance of separation between a second projection surface and the second user; and
render a shared computer simulated environment as the projected image, wherein the at least one processor processes the first position data for the first user and the second position data for the second user such that the shared computer simulated environment is generated in a perspective relative to the current position of the first user within the first field of detection and includes a visual representation of the current position of the second user within the second field of detection.

2. The system of claim 1, wherein the first plurality of sensors comprise at least one of: cameras, ultrasonic distance sensors, radar sensors, and Light Detection and Ranging (LIDAR) sensors.

3. The system of claim 2, wherein the first plurality of sensors comprise the cameras, and the cameras comprise at least one of: front-facing cameras, and rear-facing cameras.

4. The system of claim 3, wherein the first position data for the first user comprises at least one of: a head position of the first user, an orientation of the first user, and movement of the first user.

5. The system of claim 4, wherein the at least one processor is configured to process the first position data for the first user such that the shared computer simulated environment includes a three-dimensional (3-D) image rendering of an environment having depth perception with respect to the head position of the first user.

6. The system of claim 5, wherein the at least one processor is configured to process the first position data for the first user such that the 3-D image rendering is generated using predictive data calculated based on currently captured position data representing current movement of the first user within the first field of detection, and historical captured position data representing past movement of the first user within the first field of detection.

7. The system of claim 1, wherein the at least one processor is configured to process additional data from a plurality of third sensors arranged at a remote location and capturing imagery representing the remote location.

8. The system of claim 7, wherein the shared computer simulated environment includes a three-dimensional (3-D) image rendering simulating an environment of the remote location.

9. The system of claim 1, wherein the first projection surface comprises a screen, a wall, a plurality of screens, or a plurality of walls.

10. The system of claim 1, wherein the first projector comprises at least one projection port and optics for optically projecting the image.

11. A method, comprising:
projecting, using a first projector, an image onto a first projection surface arranged at a first distance of separation from a first user;
forming, using a first plurality of sensors, a first field of detection with respect to a first area of space encompassing the first distance of separation between the first projection surface and the first user;
capturing, using the first plurality of sensors, first position data for the first user representing a current position of the first user within the first field of detection;
receiving second position data captured by a second plurality of sensors for a second user remotely located from the first user, the second position data representing a current position of the second user within a second field of detection formed with respect to a second area of space encompassing a second distance of separation between a second projection surface and the second user;

processing the first position data and the second position data to generate a shared computer simulated environment in a perspective relative to the current position of the first user within the first field of detection and including a visual representation of the current position of the second user within the second field of detection; and rendering the shared computer simulated environment as the projected image.

12. The method of claim 11, further comprising:
projecting, using a second projector, an image onto the second projection surface;
forming, using the second plurality of sensors, the second field of detection; and
capturing, using the second plurality of sensors, the second position data.

13. The method of claim 11, further comprising: processing the first position data for the first user such that the shared computer simulated environment includes a three-dimensional (3-D) image rendering of an environment having depth perception with respect to a head position of the first user.

14. The method of claim 13, further comprising:
calculating predictive data associated with the first user based on the first position data representing the current position of the first user within the first field of detection, and historical captured position data representing a past position of the first user within first the field of detection; and
processing the predictive data associated with the first user such that the 3D-image rendering is in a perspective relative to a predicted position of the first user within the first field of detection.

15. The method of claim 11, wherein:
the method further comprises processing additional data from a plurality of third sensors capturing imagery representing a remote location; and
the shared computer simulated environment includes a three-dimensional (3-D) image rendering simulating an environment of the remote location.

16. A non-transitory machine-readable storage medium comprising instructions executable by at least one processor, the instructions programming the at least one processor to perform operations comprising:
obtaining first position data captured by a first plurality of sensors, the first position data representing a current position of a first user within a first field of detection formed by the first plurality of sensors with respect to a first area of space encompassing a first distance of separation between a first projection surface and the first user;
obtaining second position data captured by a second plurality of sensors for a second user remotely located from the first user, the second position data representing a current position of the second user within a second field of detection formed with respect to a second area of space encompassing a second distance of separation between a second projection surface and the second user;
processing the first position data and the second position data to generate a shared computer simulated environment in a perspective relative to the current position of the first user within the first field of detection and including a visual representation of the current position of the second user within the second field of detection; and
rendering the shared computer simulated environment for projection, by a first projector, as an image onto the first projection surface.

17. The non-transitory machine-readable storage medium of claim 16, wherein the operations further comprise: processing the first position data such that the shared computer simulated environment includes a three-dimensional (3-D) image rendering of an environment having depth perception with respect to a head position of the first user.

18. The non-transitory machine-readable storage medium of claim 17, wherein the operations further comprise:
calculating predictive data associated with the first user based on the first position data representing the current position of the first user within the first field of detection, and historical captured position data representing a past position of the first user within first the field of detection; and
processing the predictive data associated with the first user such that the 3D-image rendering is in a perspective relative to a predicted position of the first user within the first field of detection.

19. The non-transitory machine-readable storage medium of claim 16, wherein:
the operations further comprise processing additional data from a plurality of third sensors capturing imagery representing a remote location; and
the shared computer simulated environment includes a three-dimensional (3-D) image rendering simulating an environment of the remote location.

* * * * *